United States Patent
Redmann et al.

(10) Patent No.: US 8,395,751 B2
(45) Date of Patent: Mar. 12, 2013

(54) METHOD AND APPARATUS FOR PRE-FIRING CUES DURING A DIGITAL CINEMA PRESENTATION

(75) Inventors: William Gibbens Redmann, Glendale, CA (US); James Paul Sabo, Sunland, CA (US); Mark Leroy Walker, Castaic, CA (US)

(73) Assignee: Thomson Licensing, Issy les Moulineaux (FR)

( * ) Notice: Subject to any disclaimer, the term of this patent is extended or adjusted under 35 U.S.C. 154(b) by 326 days.

(21) Appl. No.: 12/736,466

(22) PCT Filed: Jun. 27, 2008

(86) PCT No.: PCT/US2008/008075
§ 371 (c)(1), (2), (4) Date: Oct. 8, 2010

(87) PCT Pub. No.: WO2009/139752
PCT Pub. Date: Nov. 19, 2009

(65) Prior Publication Data
US 2011/0025981 A1 Feb. 3, 2011

Related U.S. Application Data

(60) Provisional application No. 61/127,911, filed on May 16, 2008.

(51) Int. Cl.
*G03B 21/32* (2006.01)
*G03B 21/50* (2006.01)
(52) U.S. Cl. ........................................................ 352/40
(58) Field of Classification Search .................. 352/40, 352/123; 455/3.1; 348/465, 552; 715/731, 715/730, 37, 74, 105, 86
See application file for complete search history.

(56) References Cited

U.S. PATENT DOCUMENTS

| 3,609,020 A | * | 9/1971 | Kelly | 352/40 |
| 4,385,814 A | * | 5/1983 | Elliott | 352/92 |
| 5,872,615 A | * | 2/1999 | Harris, Jr. | 352/25 |
| 6,700,640 B2 | * | 3/2004 | Morley et al. | 352/40 |
| 6,812,994 B2 | | 11/2004 | Bubie et al. | |
| 6,829,033 B2 | * | 12/2004 | Hose et al. | 352/40 |

(Continued)

FOREIGN PATENT DOCUMENTS

| AU | 2002338461 | 11/2002 |
| AU | 2005285013 | 3/2006 |

(Continued)

OTHER PUBLICATIONS

IBM Research Document—RD431127 Abstract: "Use of a hand-held device for shopping to locate products in a store and to make a purchase decision based on information on the label/packaging."

(Continued)

*Primary Examiner* — William C Dowling
(74) *Attorney, Agent, or Firm* — Robert D. Shedd; Robert B. Levy

(57) ABSTRACT

Digital cinema exhibition facilities make use of a show play list (SPL) specifying a time sequence of the events to occur during the presentation of digital cinema content. One or more cues in the show play list trigger certain activities, such as displacing the screen curtain and dimming the house lights. To achieve an aesthetic, showman-like presentation, the cues in the show play undergo re-cueing. For each cue, a determination is made automatically of the prefire interval, that is, the interval by which the cue should be advanced. The execution the cue to trigger a corresponding activity is advanced by the automatically determined prefire interval.

10 Claims, 5 Drawing Sheets

U.S. PATENT DOCUMENTS

| | | | |
|---|---|---|---|
| 6,982,780 B2 * | 1/2006 | Morley et al. | 352/38 |
| 7,199,857 B2 * | 4/2007 | Paige et al. | 352/40 |
| 7,236,227 B2 * | 6/2007 | Whyte et al. | 352/40 |
| 2002/0122154 A1 | 9/2002 | Morley et al. | |
| 2002/0122155 A1 | 9/2002 | Morley et al. | |
| 2003/0048418 A1 | 3/2003 | Hose et al. | |
| 2005/0062935 A1 | 3/2005 | Bubie et al. | |
| 2009/0099919 A1 * | 4/2009 | Schultheiss et al. | 705/14 |
| 2009/0106660 A1 | 4/2009 | Naylor et al. | |
| 2011/0041062 A1 * | 2/2011 | Singer et al. | 715/730 |
| 2012/0230653 A1 * | 9/2012 | Redmann | 386/241 |

FOREIGN PATENT DOCUMENTS

| | | |
|---|---|---|
| AU | 2005309929 | 6/2006 |
| AU | 2006235988 | 11/2006 |
| EP | 1427218 | 6/2004 |
| JP | 2004533141 | 10/2004 |
| JP | 2007117709 | 5/2007 |
| JP | 2008512972 | 4/2008 |
| JP | 2009506591 | 2/2009 |
| KR | 20030080053 | 10/2003 |
| WO | WO02086664 | 10/2002 |
| WO | WO2006031778 | 3/2006 |
| WO | WO2006057747 | 6/2006 |
| WO | WO2007021296 | 2/2007 |

OTHER PUBLICATIONS

Search Report dated Oct. 22, 2008.

* cited by examiner

FIG. 4

| SCREEN | CUE | PREFIRE | |
|---|---|---|---|
| 1 | START OF SHOW | 0:00:10 | 310 |
| 1 | START OF FEATURE | 0:01:00 | 311 |
| 1 | START OF INTERMISSION | 0:01:00 | 312 |
| 1 | END OF INTERMISSION | 0:00:10 | 313 |
| 1 | START OF CREDITS | 0:01:00 | 314 |
| 1 | END OF SHOW | 0:01:00 | 315 |
| 2 | START OF SHOW | 0:00:10 | 320 |
| 2 | START OF FEATURE | 0:00:00 | 321 |
| 2 | START OF INTERMISSION | 0:00:00 | 322 |
| 2 | END OF INTERMISSION | 0:00:00 | 323 |
| 2 | START OF CREDITS | 0:00:00 | 324 |
| 2 | END OF SHOW | 0:00:00 | 325 |

…

METHOD AND APPARATUS FOR PRE-FIRING CUES DURING A DIGITAL CINEMA PRESENTATION

CROSS-REFERENCE TO RELATED APPLICATIONS

This application claims the benefit, under 35 U.S.C. §365 of International Application PCT/US2008/008075, filed Jun. 27, 2008 which was published in accordance with PCT Article 21(2) on Nov. 19, 2009 in English and which claims the benefit of U.S. provisional patent application No. 61/127,911 filed May 16, 2008.

TECHNICAL FIELD

This invention relates to a technique for controlling one or more activities during a digital cinema presentation.

BACKGROUND ART

During the exhibition of a motion picture in a movie theater, certain activities occur. For example, in advance of the actual presentation, a curtain covering the screen will draw open and the house lights dim. In the past, theater personnel performed these activities manually. Today, many movie theaters make use of a Screen Automation System (SAS) for performing such tasks. In the case of a conventional celluloid film print, a projectionist or other theater personnel will typically affix a piece of metal foil to the film print such that at a particular time during the exhibition of the film, the foil will pass by a reader. The passage of the metal foil past the reader gives rise to a signal the triggers the SAS to initiate a particular activity, such as dimming the lights or actuating the curtain.

In the case of the presentation of digital cinema content, a different mechanism exists for triggering the theater SAS. A typical digital cinema presentation incorporates a "show playlist" which, as defined in the National Association of Theater Owners *Digital Cinema System Requirements*, document (Release 1.0 2006) (http://www.natoonline.org/NATO%20Digital%20Cinema%20System%20Requirements%20-%20release%201-02.pdf) comprises a list of time-sequenced compositions, each having a corresponding Composition Playlist (CPL) and automation cues interlaced in the CPL. Exemplary cues include the Start of Show, Start of Feature, Start of Intermission, End of Intermission, Start of End Credits, and End of Show. Traditionally, the position of each cue within each CPL corresponds precisely to a position within an event timeline of the event the cue represents. For instance, the Start of Show cue lies immediately prior to the first frame of the first CPL. Similarly, the Start of Feature cue lies immediately prior to the first frame of the feature presentation CPL. In order to present the digital cinema content, the cues must reside at their proper locations within the playlist. Otherwise, the activities controlled by such cues will not occur automatically at the proper times.

Cue placement within the CPL to correspond precisely to the event in the timeline (e.g., placing the Start of Feature cue immediately prior to the first frame of the feature) can give rise to certain drawbacks. In some movie theaters, the facilities systems and the automation systems can operate to provide a more showman-like presentation upon advance notice of a change in certain circumstances. For instance, a projector might require a certain interval to warm up. Further, the screen curtain should close and the reopen prior to the start of the feature. Previously, such concerns, if not ignored, were addressed by manually advancing each cue by an appropriate, predetermined amount of time (e.g., 60-seconds) and then allowing the Screen Automation System (SAS) to manage the timing of actions relative to the newly advanced cue, hereinafter referred to as a "prefired" cue. Thus, in an auditorium where dimming the lights constitutes an activity resulting from the Start of Feature cue, the SAS will initiate that activity a fixed time, say 60-seconds, following the issuance of a Start of Feature cue by a Screen Management System.

However, not every movie theater uses the same type of light dimmers. For example, a given movie theater might possess a light dimming system that fades the lights over a 20-second interval. Taking this dimming interval into account, an exhibitor might find that the most aesthetic presentation requires light dimming ten seconds prior to the start of the feature, which corresponds to fifty seconds following the Start of Feature cue. Thus, prefiring the light dimming cue by 60-seconds for every theater would yield a sub-optimal presentation.

As another example, consider a movie theater having elaborate lighting and curtain equipment. For such a theater, the curtain close command should occur at a particular time empirically determined so that screen curtain closes at the instant the feature begins playing, after which the curtains should re-open. Such an interval will typically differ from the standard sixty second prefiring interval. Applying the standard sixty second prefire interval under circumstances would cause the feature to begin playing either too early or too late with respect to the closing and re-opening of the screen curtain. The timing for dimming the lights typically will vary as well from theater to theater. Other actions might require different timing, such as pausing playout of the CPLs for a brief interval, when a predetermined interval has elapsed or some variable duration event has occurred, such as the manual triggering of a signal.

Certainly, an advantage accrues by providing a single SPL having cues with corresponding predetermined prefire offsets because such an SPL can undergo execution in any auditorium having an SAS configured to handle cues having substantially the same corresponding prefire offset. The resulting playout of the digital cinema content will have an aesthetic, showman-like presentation. However, this approach incurs the disadvantage that a projectionist or other theater personnel constructing the SPL must have knowledge of the appropriate, predetermined prefire offset for each kind of the cue inserted into the SPL. Also, the presence of the cues having prefires can result in an awkward-looking SPL presentation, where the 'Start of Feature' cue might occur halfway through the trailer CPL prior to the exhibitor-branded 'And now our Feature Presentation' CPL positioned prior to the actual feature CPL.

In the case of a Start of Show cue, present-day Screen Management Systems typically do not support a timeline having a cue positioned at any time earlier than immediately prior to the beginning of the first CPL. Thus, no normal way exists to position a Start of Show cue with a prefire of any non-zero offset from the start of the first CPL. To workaround to this problem, a projectionist or other theater personnel will prepend an interval of black content, typically as a CPL having a predetermined number of seconds filled with black pixels, to the head of SPL, and placing the Start of Show cue within this interval according to the predetermined prefire offset. Having prefired cues in the SPL affords the ability to produce an optimal presentation in any auditorium but the look and configuration of the SPL will not be intuitive, convenient, or reliable. Projectionists, being human, can make errors in the SPL such as omitting or misplacing cues, forgetting the black CPLs, forgetting prefire offsets, and providing incorrect prefire offsets. Should one or more CPLs intervene between the prefired cue and the associated event (as discussed above); the projectionist must understand the duration of those CPLs. Using such information, the projectionist must subtract such time values from the prefire interval and position the actual cue within the appropriate CPL at the residual prefire offset before the end, a daunting task.

Thus a need exists for a technique for managing activities in connection with the presentation of digital cinema content that overcomes the aforementioned disadvantages.

BRIEF SUMMARY OF THE INVENTION

Briefly, a preferred embodiment of the present principle provides a method for controlling activities in connection with the presentation of digital cinema content. The method commences by examining a playlist specifying a time sequence of events to occur during the presentation of digital cinema content to identify at least one cue which triggers the occurrence of an activity. For each identified cue, a determination is made automatically of the prefire interval, that is, the interval by which the cue should be advanced. The execution of the at least one cue to trigger the corresponding activity is advanced by the automatically determined pre-fire interval.

BRIEF SUMMARY OF THE DRAWINGS

FIG. 4 depicts a database within the digital cinema system of FIG. 1 for storing predetermined prefires for cues.

DETAILED DESCRIPTION

Figure 1:
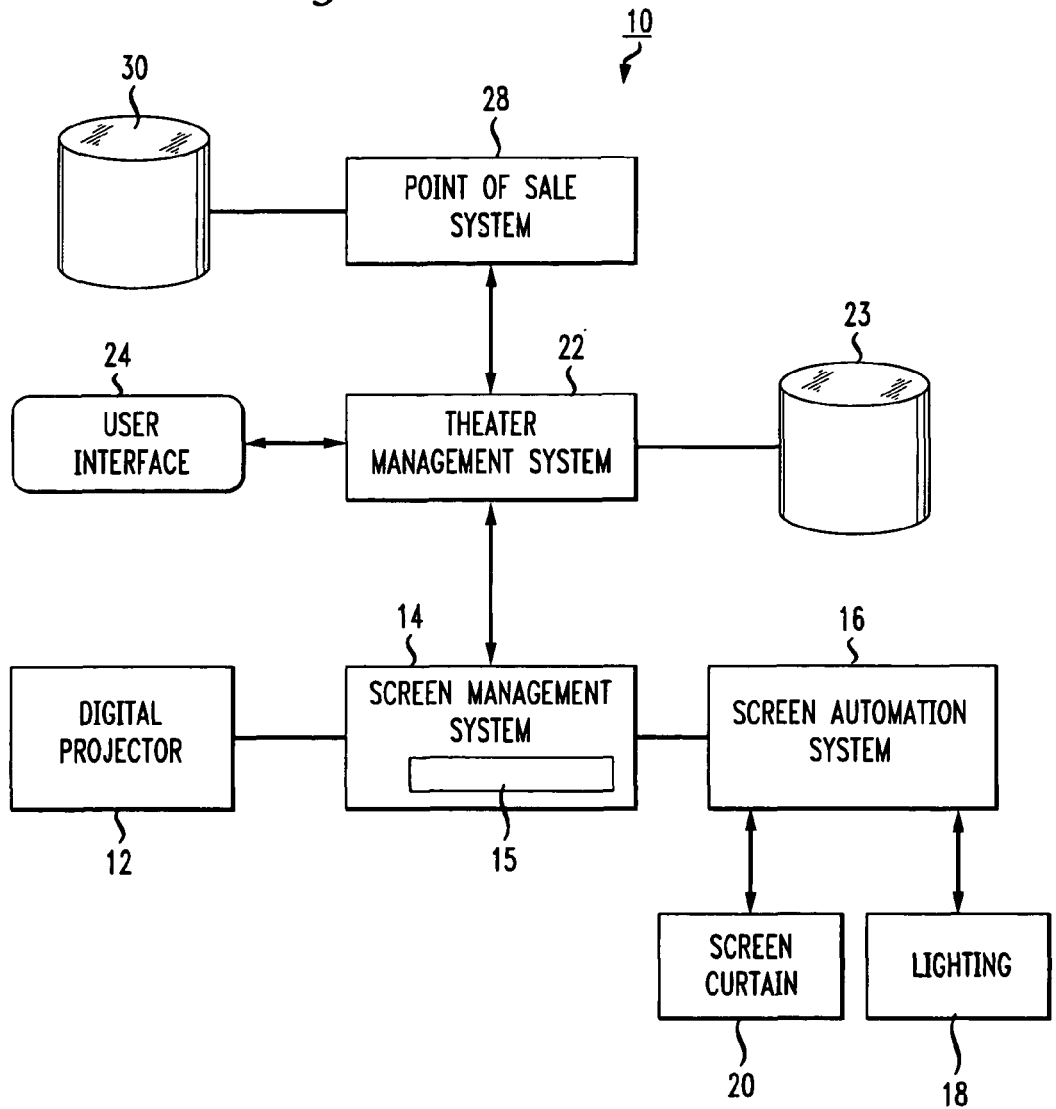
FIG. 1 depicts a block schematic diagram of a digital cinema system for practicing the activity control technique of the present principles.

FIG. 1 depicts a preferred embodiment digital cinema system 10 which advantageously controls activities during a presentation of digital cinema content in accordance with automatically prefired cues. As described hereinafter, pre-fired cues constitute whose execution automatically adjusts in accordance with theater parameters, in accordance with the present principles. The digital cinema system 10 of FIG. 1 includes at least one digital cinema projector 12 associated with a particular movie theater auditorium. A movie theater can possess multiple auditoriums, each having its own digital cinema projector. For ease of discussion, FIG. 1 depicts a single digital cinema projector 12. Digital cinema projectors have become well known and are available from several manufacturers, including, but not limited to BARCO, NEC and SONY for example.

The digital cinema projector 12 operates under the control of a Screen Management System 14 which typically includes a digital cinema server 15 that contains instructions and data for controlling both the digital projector 12 as well as a Screen Automation System (SAS) 16. The SAS 16 controls certain systems, such as a theater lighting system 18 and a screen curtain system 20. The theater lighting system 18 controls the brightness of the lighting, and upon an appropriate control signal from the SAS 16, will dim the house lights in advance of the presentation of the digital cinema content. The screen curtain system 20 serves to displace a curtain (not shown) across a screen. In response to a command from the SAS 16, the screen curtain system 20 will typically close the curtain and then open the curtain just prior to the presentation of the digital cinema presentation. In addition, the SAS 16 can also control the theater audio system (not shown) to control audio levels, as well as the playing of announcements.

The digital cinema server 15 within the SMS 14 can take the form of a well known digital cinema server, such as manufactured by Dolby Laboratories, San Francisco Calif., Doremi Digital Cinema, Burbank Calif. and Eastman Kodak, Rochester, N.Y., among others. The digital cinema server 15 includes a decoding module (not shown) for responding to commands received from a theater management system 22. The theater management system 22 includes a computer (not shown) programmed with software for accepting one or more presentation start time schedules and for monitoring and controlling the to playout digital cinema content according to a working presentation start time schedule. In practice, the working presentation start time schedule resides in a database 23 associated with the theater management system.

The theater management system 22 receives commands and provides status information through at least one user interface 24. In practice, the user interface 24 comprises a web browser running on a processor (not shown) having an associated monitor, mouse, and keyboard or touch screen (not shown). The processor communicates with theater management system 22, which provides a monitoring and control interface through an http service. Further, the user interface 24 preferably constitutes an application written in Flash™ software available from Adobe Systems of San Jose, Calif. wherein the web browser downloads the user interface application to communicate with theater management system 22 to obtain access to monitoring and control information therefrom. Alternatively, the user interface 24 could comprise a monitor, mouse, and keyboard or touch screen (not shown) connected directly to the theater management system 22. Further, the user interface 24 could comprise a Personal Data Assistant, or other mobile data terminal, linked to the theater management system 22 via a wireless connection.

As shown in FIG. 1, theater management system 22 enjoys a communication link to a Point of Sale (POS) system 28 responsible for issuing tickets to theater patrons and for tracking ticket sales. The POS system 120 has access to a database 30 that stores one or more published start time schedules among other information.

Figure 2:
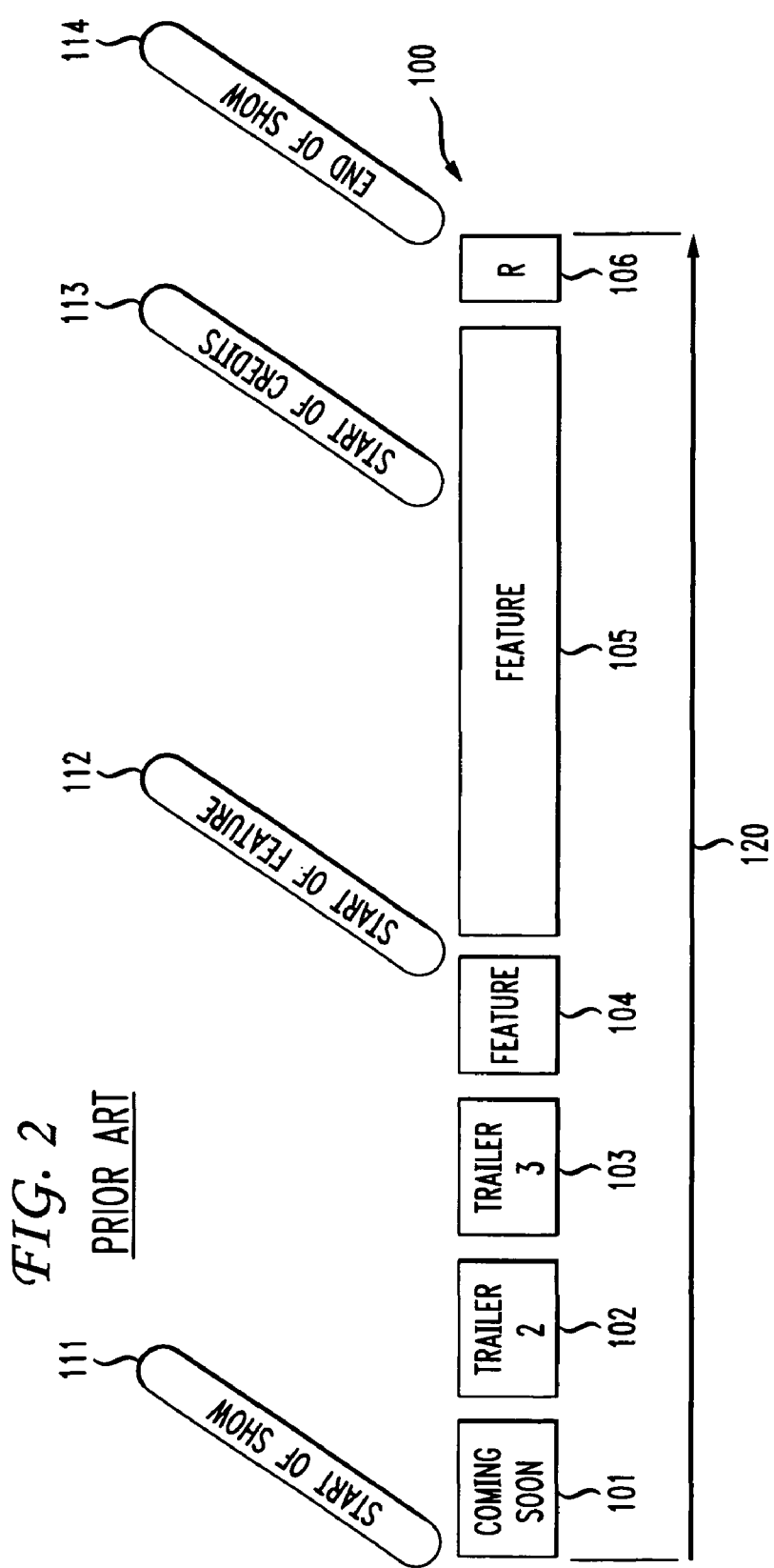
FIG. 2 depicts a timeline representative of a prior show playlist for having cues.

The digital cinema server 15 within the SMS 14 of FIG. 1 controls the digital projector 12 to playout digital cinema content in accordance with a show playlist. FIG. 2 depicts a typical art show playlist (SPL) 100 according to the prior art. The SPL 100 of FIG. 2 comprises of a sequence of composition playlists (CPL) 101, 102, 103, 104, 105, and 106 for example, each of which represents a digital cinema asset such as movie trailers 102 and 103, interstitial or policy assets 101 and 104, a feature 105, and a rating card 106. Interspersed within and among the CPLs are cues 111, 112, 113, 114 which mark locations within the SPL corresponding to the occurrence of certain activities. The direction of arrow 120 indicates the flow of time, and represents the timeline over which the playout of the content occurs in accordance with the SPL 100. It is important to note that cues marking locations in the SPL are considered to have substantially no duration although, in some implementations, the position cannot be more tightly indicated than within a specific frame of content. The non-zero width of the cues and the gaps that between the CPLs in SPL 100 appear for the sake of clarity and do not represent a gap in the timeline represented by arrow 120.

The CPLs and digital cinema assets have well understood definitions provided in the following publications distributed by the Society of Motion Picture and Television Engineers, White Plains, N.Y., "SMPTE 429-7-2006 D-Cinema Packaging—Composition Playlist" and "SMPTE 429-3-2006 D-Cinema Packaging—Sound and Picture Track File." SPLs have become well-known, with various modern implementations offered by digital cinema equipment manufacturers including Doremi Labs, Inc. of Burbank, Calif., makers of the DCP2000 server; Dolby Laboratories of San Francisco, Calif., makers of the DSP100 and DSS100 servers; and Eastman Kodak Company of Rochester, N.Y., makers of the CineServer JN2000 servers. For a more extensive discussion of show playlists, refer to U.S. Pat. No. 6,700,640 by Morley et al., herein incorporated by reference.

In some proprietary SPL implementations, for example those used by Doremi Labs, the location of a cue is described as an offset, which may be zero, within a CPL. The offset can be designated as being relative to the beginning or end of the CPL. An alternative embodiment offered by Dolby Laboratories provides that the location of a cue within an SPL constitutes a point along timeline 120. According to the present principles, either description can apply since for either embodiment, given a sequence of the CPLs whose durations are known, a cue location of one description can be translated into another.

In a present-day digital cinema system, the SPL controls the playout of content by the digital cinema projector 12 of FIG. 1 as described. In particular, the SMS 14 of FIG. 1 makes use of the cues 111, 112, 113, and 114 of FIG. 2 during the playout of the content to drive the SAS 16 of FIG. 1. For instance, the Start of Show cue 111 of FIG. 2. lies immediately prior to the first frame of content of the "Coming Soon" interstitial CPL 101. In response, the SMS 14 triggers the SAS 16 to control the theater lighting 18 (all of FIG. 1) to dim the lights to half brightness upon encountering the Start of Show cue 111 of FIG. during playout. The Start of Feature cue 112 lies in SPL 100 between the "And now our Feature Presentation" interstitial CPL 104 and the actual feature presentation CPL 105. Upon encountering the Start of Feature cue 112 of FIG. 2 during content playout, the SMS 14 of FIG. 1 triggers the SAS 16 of FIG. 1 to further dim the theater lights.

The Start of Credits cue 113 of FIG. 2 lies within the feature CPL 105 at a point, typically selected by an individual exhibitor at the time when the end credits of the movie appear at which time the exhibitor typically wants the lights to come up to half brightness to assist audience members exiting the auditorium. The End of Show cue 115 lies at or immediately following the last frame of the final CPL, which in the United States, will initiate the display of the rating card CPL 106. Upon encountering the End of Show cue 115 in SPL 100, the lights come to full brightness to facilitate the last of the audience exiting the theater and to enable theater personnel to prepare the auditorium for the next performance.

The cues 111, 112, 113, and 114 of FIG. 2 (as well as other cues which are not shown) can trigger other activities such as striking or extinguishing the projector lamp, and/or opening and closing the projector douser.

Figure 3:
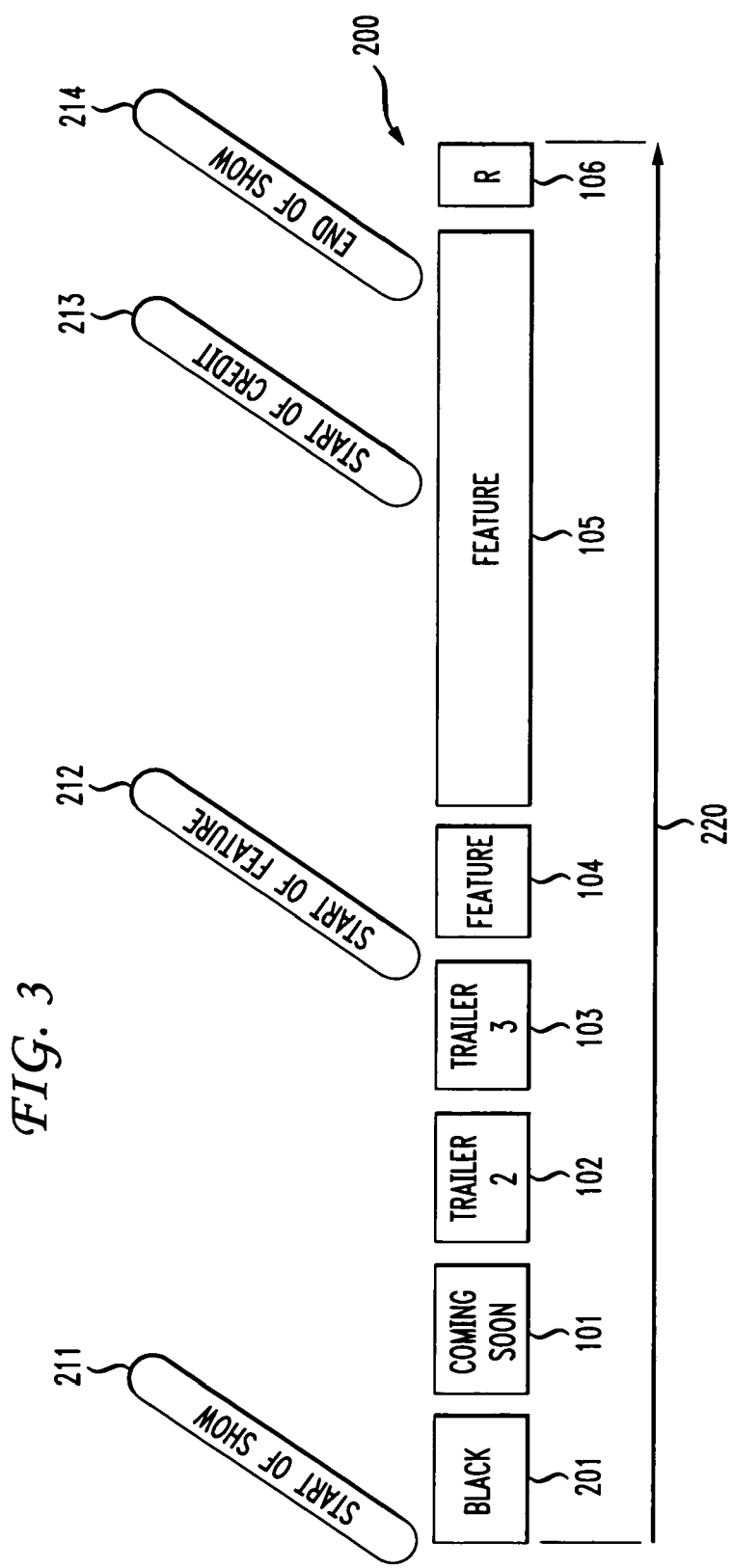
FIG. 3 is a timeline representative of a show playlist incorporating predetermined prefires for certain cues in accordance with the present principles.

FIG. 3 depicts a SPL 200 according to the present principles having timeline 220, wherein each cue 211, 212, 213, 214 lies earlier in the SPL 200 relative to the locations of the corresponding cues in SPL 100. In this way, the cues 211, 212, 213, and 214 of FIG. 3 appear earlier during playout relative to CPLs 101, 102, 103, 104, 105, and 106, respectively. Also, the SPL 200 includes an interval at the beginning, occupied by CPL 201. The CPL 201 has presentation assets that include a full-frame black picture, and a silent soundtrack. Present-day digital cinema systems require this 'black' content to explicitly create an interval within timeline 220 where no content otherwise exists.

In an alternative embodiment, the SPL 200 could comprise a timeline 220 that extends beyond the accumulated durations of the CPLs 101-106 and cue 211 could lie at a location in the timeline 220 that is some non-zero amount of time before of the first frame of first CPL 101 without the need for the black CPL 201. For example, the Start of Show cue 211 would lie a non-zero amount of time before the first frame of content in CPL 101. In this way, the start of show event represented by Start of Show cue 211 will still lie immediately prior to the first frame of content of the CPL 101, but the digital cinema system 10 of FIG. 1. will prefire the Start of Show cue 211 of FIG. 3 by some predetermined amount of time. During playout of the SPL 200 of FIG. 3, the early presence of Start of Show cue 211 relative to CPL 101 permits the digital cinema system 10 of FIG. 1 to begin a sequence of actions such as: (a) igniting the projector lamp, (b) fading out background music (BGM) previously playing in the auditorium, (c) initiating a partial dimming of the lights, (d) switching the audio to the digital cinema system after the BGM has faded appropriately, and (e) opening the projector dourer. All these events should occur with the appropriate timing such that as the content of the CPL 101 begins to play, the projector and audio become ready, and the lights and curtains are aesthetically finishing the last portion of their commanded setting.

The SPL 100 of FIG. 3 allows manual inclusion of black CPL 201 at the beginning of an SPL and manual placement of such individual cues as necessary to command the projector(s) to light, initiate dimming of the house lights, initiate curtain opening, commence BGM fadeout, switching of the audio to the digital cinema content, etc. each at individually, manually selected times; or a single Start of Show cue manually positioned to trigger an external system, such as the SAS 16 of FIG. 1 to perform an independently timed sequence of actions. Making use of the SPL 200 of FIG. 3 in accordance with the present principles produces more aesthetic results while still affording the simplicity of construction of the SPL 100 of FIG. 2.

With respect to the Start of Feature cue 212, the amount of time by which this cue precedes the actual start of the feature CPL 105 will exceed the duration of "And now our Feature Presentation" interstitial CPL 104. Thus, the Start of Feature cue 212 will lie at a point on timeline 220 that occurs during trailer CPL 103 such that the total duration of the CPL 104 plus the offset of the cue 212 from the end of the CPL 103 substantially equals the effective prefire of the cue 212. The End of Credits cue 213 occurs earlier within feature CPL 105 in SPL 200 of FIG. 3 than does the corresponding End of Credits cue 113 within CPL 105 in SPL 100 of FIG. 2 by a predetermined amount of time specific to End of Credits cue.

The End of Show cue 214 lies within feature CPL 105 at an offset from the end of the CPL 105 which, when added to the total duration of the CPL 106 represents a predetermined amount by which the End of Show cue 214 commences prefiring relative to the end of the show, which coincides with the location immediately following the end of the last CPL. In an alternative embodiment, the SPL 200 also could have an interval of black (not shown) following the last CPL 106 to extend the timeline 220 past the final content elements. Adding such an interval would give rise to an aesthetic buffer time during which suppression of the BGM and the on-screen ads occurs to prevent their being immediately juxtaposited following a dramatic movie conclusion. Further, including such an interval could provide a location for a later cue (not shown) to trigger an interval where work lights illuminate in the theater to assist theater personnel to prepare for the next show.

In order to automatically support the translation of a prior art SPL, such as SPL 100 of FIG. 2, having intuitively and simply placed cues 111, 112, 113, and 114 into an SPL playout, in accordance with the present principles, with cues, such as 211, 212, 213, and 214 of FIG. 3, issued with predetermined prefires, the database 23 or the SMS 14 of FIG. 1 can include a database 300, shown in FIG. 4, which enumerates a predetermined prefire value for each cue. One or more cues could have a prefire value of zero. Cues not listed the database will have a predetermined default prefire value, either zero or some preselected value.

The Database 300 of FIG. 4 includes a plurality of records 310-325. Each record, such as record 310 for example has a Screen field 301, a Cue field 302, and a Prefire field 303. The Screen field 301 for a given record identifies the particular theater auditorium associated with the cue identified in corresponding cue field 302. The Prefire field 303 in the given record identifies the prefire interval for the corresponding cue identified in the cue field 302. In many instances, different theater auditoriums showing the same content will share the same SPL, such as the SPL 200 of FIG. 3. However, even though different auditoriums will share the same SPL, the auditoriums can have different systems for lighting and screen curtains, and thus different prefires. Thus, associating the particular screen for a given cue and corresponding prefire helps for tracking purposes. In the illustrated embodiment of FIG. 4, the records 310-315 associated with the cues and corresponding prefires for Screen 1 constitute a first record group 304, whereas the records 320-325 associated with the cues and corresponding prefires for Screen 2 constitute a second record group 305. In a preferred embodiment, however, all of the prefires for all of the screens of a given exhibitor would possess the same prefire value for each cue of a given type for the sake of consistency.

In practice, different methodologies and criteria can apply to establish the prefire values in the database 300 of FIG. 4. As a practical matter, establishing the prefire value in the field 303 of each of the records 310-325 for the cue identified in the corresponding cue field 302 becomes a matter of design choice for a particular auditorium identified in the Screen field 301. As an example, for digital cinema installations undertaken by Technicolor Digital Cinema, Inc, of Burbank, Calif., the prefire value 303, if non-zero, is usually sixty seconds (0:01:00), that is, exactly one minute. This value was selected empirically as being: (a) sufficient for all known examples of the timing required for the largest motion picture curtains in Hollywood premiere theatres to cycle from an open position to closed and back to open again (i.e., a 'curtain call'), which was considered to be the action requiring the longest prefire; (b) not too excessive in comparison with more typical prefires (many of which are on the order of 0-10 seconds); (c) easy to remember without confusion, and (d) easy to enter into prior art SPL editors given that times are typically being entered with an offset of exactly one-minute with respect to whatever other offset they normally they would normally have.

Within exhibition facilities configured according to the empirical plan described above, the automation system (e.g., SAS 16 of FIG. 1) expects to receive a signal sixty seconds in advance of most events. So, for example, the automation system expects the Start of Feature cue sixty seconds in advance of the start of the feature. For a curtain call to begin twenty seconds prior to the start of the feature, then the automation system will accept the Start of Feature cue, wait for forty seconds, and thereafter trigger the curtains to close. Once closed, the curtains reopen, with the aesthetic result of the curtain completing its closure and starting its reopening just as the feature CPL 105 begins to play.

However, a sixty second prefire becomes awkward for certain cues. For example, in cases of both the Start of Show cue and the End of Intermission cue (not used in the SPL 100 and 200 of FIGS. 2 and 3, respectively), the actions performed by the automation system frequently occur as a result of manual initiation, or in response to some external trigger provided by a system not capable of a prefire (e.g., a legacy presentation system that provides advertisements on-screen prior to the start of the presentation by the digital cinema system). In these cases, the prefire value is preferably kept low, or set to zero. Ten seconds has been empirically found to be a reasonable value, as has zero. Having non-standard values (i.e., different than sixty seconds) eliminates the advantages of being easily remembered and being easily entered. Such non-standard prefire values mandate special treatment and require additional effort to enter using present day SPL user interfaces. However a standard prefire value of sixty seconds under such these circumstances would violate the requirement of (b) of not being too excessive. Past efforts to address this problem relied on careful training of exhibition personnel to correct errors resulting in a clumsy presentation timing (i.e., an audience sitting in a ready, but quiet, theatre for almost a minute) before the next showing.

As discussed further below, a preprocessor (not shown) can implement an automatic process which converts the SPL 100 of FIG. 2 to yield a SPL 200 of FIG. 3 for distribution to a digital cinema system, such as system 10 of FIG. 1, for playout. Such preprocessor could exist within the TMS 22 or the SMS 14, both of FIG. 1, or alternatively, an existing processor (not shown), each having access to the database 300, could perform such preprocessing. Assuming similar equipment configurations throughout the theatre with similar expected prefire values for cues of a given kind, then an SPL, such as SPL 200 of FIG. 3, prepared with such prefire values, could find use in any auditorium within the exhibition theatre with the desired results. However, if the equipment configurations differ from auditorium to auditorium within a given theater, then the database 300 of FIG. 4 would store the auditorium-individualized prefires as shown. Thus, under such circumstances, the SPL 200 of FIG. 3, prepared for auditorium 1 using the records in group 304 of FIG. 4, will differ from the SPL for auditorium 2 prepared using the records from the group 305 of FIG. 4.

In another embodiment of the present principles discussed in more detail below, the SPL 100 of FIG. 2 can produce the behaviors (i.e., the cue timings relative to content playout) defined by the SPL 200 of the present principles by applying the prefire timings at or near runtime. Thus, an explicit expression of the SPL 200 need not occur provided that the digital cinema system emulates the behavior dictated by this SPL before and during playout of the content.

To summarize, at least two implementations can accomplish prefiring of the cues. A first implementation produces the SPL 200 of FIG. 3 by translating the SPL 100 of FIG. 2 for use in the digital cinema system 10 of FIG. 1, A second implementation modifies the SPL 100 using the database 300 of FIG. 4 to produce the behavior described by SPL 200 of FIG. 3.

Figure 5:
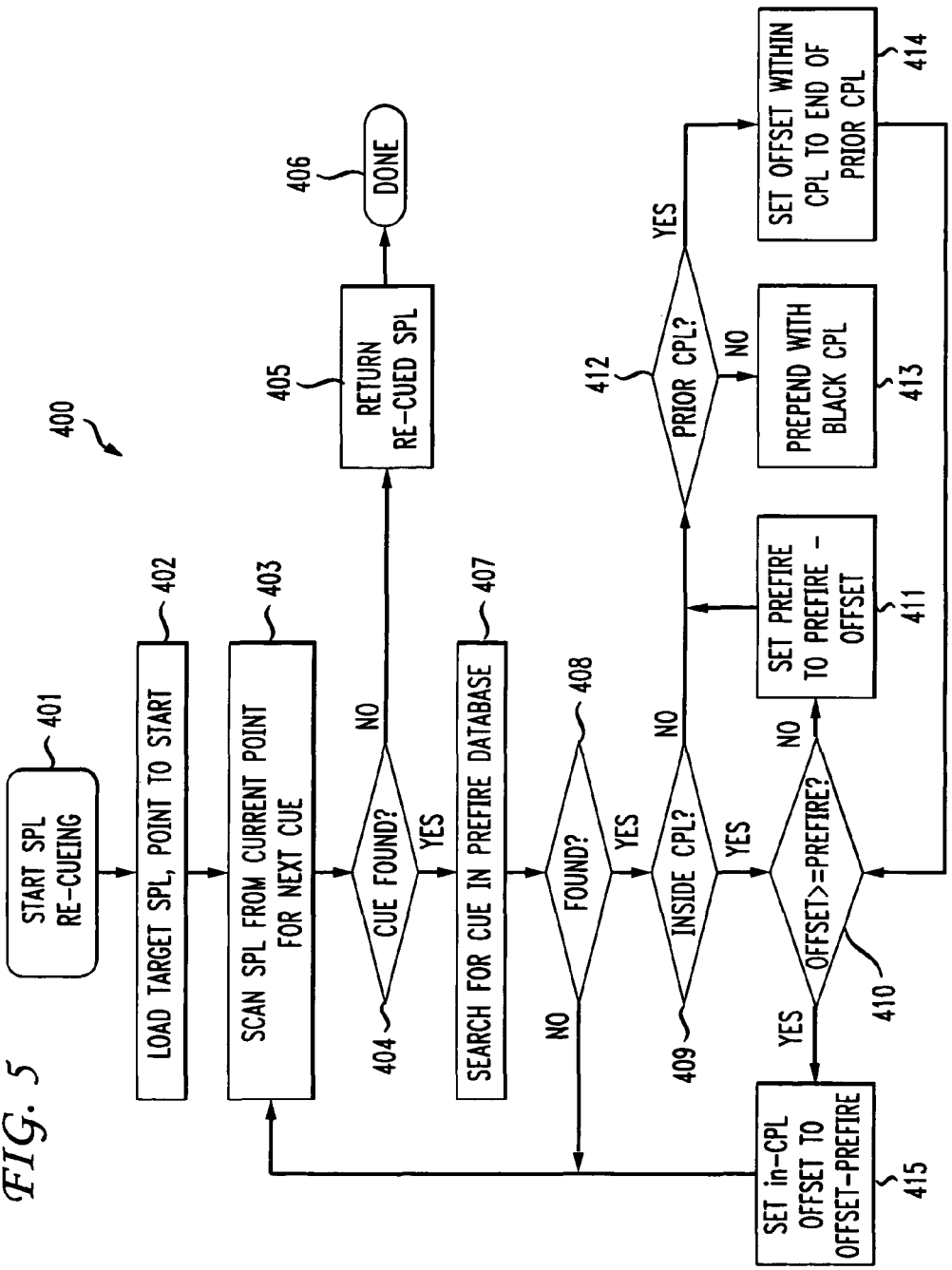
FIG. 5 depicts in flow chart form a set of steps of a process in accordance with the present principles for converting the show playlist of FIG. 2 into a show playlist having prefired cues.

FIG. 5 describes a process 400, hereinafter referred as the SPL re-cueing process, for establishing the prefire values to provide each of the two implementations described above. The SPL re-cueing process 400 operates by accepting an intuitive, prior art SPL 100 having cues located at easily indicated positions. Execution of the SPL re-cueing process 400 can occur in advance to generate the SPL 200 of FIG. 3 (now re-cued) from the SPL 100 of FIG. 2 using the database 300. Alternatively, the SPL re-cueing process can operate in real-time, during a performance of SPL 100 to produce the cue timing behaviors described in SPL 200. As well become better understood hereinafter, the following detailed description supports both possibilities.

Referring to FIG. 5, the SPL re-cueing process 400 begins with step 401 during which initialization occurs. Next, step 402 undergoes execution to commence loading of an SPL having no prefire on its cues, such as SPL 100 of FIG. 2, and to place an index into the SPL file at the start of its timeline, that is, at the time 00:00:00.00. In the case of real-time performance, system assets will typically undergo validation during execution of the initialization step 401. Completion of the execution of step 402 preferably occurs shortly before the expected start time of the presentation (with the preferable meaning of 'shortly' being 'not less than the prefire value for the Start of Show cue).

The step 403 follows step 402 at which time the SPL 100 loaded during step 402 undergoes scanning (i.e., examination) beginning from the current position in the timeline to find the next cue. A check occurs during the step 404 to determine whether the scanning of the SPL yielded a cue. Upon finding no cue before the end of SPL 100, then execution of step 405 occurs to return to the re-cued SPL. The remaining CPLs of SPL 100, if any, get appended sequentially to create the SPL 200 and the output file is closed. In a real-time performance system, these remaining CPLs undergo playout out in sequence. At step 406, the process ends and resources taken by process 400, including the input file SPL 100, get released and processing concludes.

Upon finding a cue during step 404, process execution branches to step 407 to execute a search of the database 300 of FIG. 4 to determine the appropriate prefire value 303 for the found cue. If the search finds no cue in database 300, a predetermined default value, typically, although not necessarily zero, gets assigned. In an alternative implementation, the prefire value 303 gets determined by a predetermined set of rules or by one or more algorithms. Implementation of such rules could result in translation of a cue of one type into a cue of another type, or elimination of the cue, and could make use of additional parameters. For instance, an Intermission Start cue might have predetermined values in database 300 for individual auditoriums. However, the Intermission Start cue might be ignored, that is, dropped, if the clock time at which the Intermission Start cue is expected to occur actually does occur is a time at which the concession stands are closed (i.e., during the last show of the night).

During step 408, a check occurs whether the search initiated during step 407 resulted in finding a cue in the database 300 of FIG. 4. Upon finding no information in the database during step 408 of FIG. 5, then the cue is ignored and processing returns to step 403 to seek the next cue. However, upon finding a prefire value or a default value exists, then processing continues at step 409 of FIG. 5 at which time a check occurs to determine whether the cue being examined lies inside a CPL. For those digital cinema systems that require the cue reside within a CPL, a cue having an offset of zero from the beginning of a CPL would be considered as lying outside of the CPL and to occur immediately before it. If the cue location coincides with a time on the timeline at which a CPL begins, then the same assumption applies, namely that the cue lies outside of the CPL and occurs immediately before it. The foregoing represents an example, as mentioned above, of the possibility of the conversion between CPL-offset and timeline-based representations of the cue location.

If the check performed during step 409 reveals that that the cue lies inside of a CPL, then a check occurs during step 410 to determine whether the offset of the cue from the start of the CPL at least equals the prefire value. If so, then step 415 undergoes execution to adjust the cue offset in the same CPL so the cue gets adjusted by the prefire amount to locate the cue closer to the start of the CPL. That is, if the cue had an original offset from the start of the CPL (or from the start of the timeline), the adjusted offset now equals the original offset minus the prefire value. However, if the cue had an original offset from the end of the CPL, then the adjusted offset becomes the original offset plus the prefire value. Following step 415, the output file for SPL 200 gets written with the adjusted cue offset. For real time performance, the system can wait for a sufficient time to elapse for this cue's new location to coincide with the current time on the time line before continuing re-cueing process 400 at step 403.

If the check made during step 410 finds that the prefire value exceeds the offset of the cue from the start of the CPL, then the cue gets effectively moved to the start of the CPL and the prefire gets reduced by the amount of that movement during step 411. In other words, the prefire value gets reduced by the original offset of the cue from the beginning of the CPL. At this point, processing of the cue can continue as if the cue had originally resided immediately prior to the start of this CPL, which would correspond to the negative result of the check performed during step test 409: In either case, processing continues at step 412.

During step 412, a check occurs to determine whether a CPL exists prior to the current CPL ahead of which lies the cue of interest. If not, then during step 413 the timeline must undergo elongation at its start, to form a longer timeline 220. Well-known present-day systems require that a dummy CPL be inserted at the beginning of the SPL in order to extend the timeline. If the duration of this timeline extension is selectable, the value should be exactly the prefire value that remains to be accommodated. If the duration of this extension is predetermined, for example, because the available dummy CPL has a fixed length, there is no choice. If multiple dummy CPLs are available, then the shortest one having a duration greater than or equal to the un-accommodated prefire value should be selected. Otherwise, the longest available CPL constitutes a reasonable choice. In FIG. 2, the black CPL 201 represents a dummy CPL whose duration is somewhat greater than the prefire value applied to produce the location of the cue 211.

Upon determining the CPL immediately preceding the current location of the cue during step 412 or after prepending the black CPL during step 413, then execution of step 414 occurs during which the location of the cue gets set to the end of the prior CPL, or, equivalently, an offset from the start of the prior CPL equal to the duration of the CPL gets set, or, equivalently, the corresponding location on the timeline. Note, that prepending the dummy CPL to the SPL or other technique for extending the timeline to achieve an earlier start may, in some embodiments, will result in negative timeline values, that is, an offset that occurs before the original start of original first CPL 101. Methods for handling negative timeline values are well-known in the art of television and film editing, for instance, many studios and production houses designate a time code of 01:00:00.00 (one hour) as the start of the show. In this way, any content (up to an hour long) placed before the start of the show has a valid, non-negative time code value. The availability of valid time code and signal before the start of the show provides equipment the opportunity to pre-roll and synchronize to a time base so that a clean transition can occur between sources. Though less common, a negative value can exist in a time representation.

Other techniques exist for handling this situation: The entirety of the input SPL 100 can be advanced by the amount of the timeline extension; or an initially zero, global offset value between input SPL 100 and resulting SPL 200 (or an effective performance thereof in a real-time system) can be tracked and incremented by the amount of the timeline extension. Those skilled in the art should not have difficulty providing a resolution to this situation that is applicable to specific new or pre-existing digital cinema systems.

Once the location of the cue has been re-referenced to the prior CPL and the offset updated in relocation step 414, processing of the cue continues at step 410. Eventually, the SPL re-cueing process 400 provides in the output SPL 200 or a real-time playout, a location in possibly-extended the timeline 220 for each surviving cue having a location in the input SPL 100.

Application of the SPL re-cueing process 400 of the present principles provides theater personnel a more sophisticated, aesthetically pleasing technique for placing cues to manage the operation of equipment controlled by the SAS 16 off FIG. 1. As described above, the TMS 22 of FIG. 1 could perform the re-cueing process 400 of FIG. 5 in advance and then provide the resulting SPL 200 to the SMS 14 of FIG. 1 associated with an auditorium's digital cinema system. Alternatively, the SMS 14 of FIG. 1 could perform re-cueing process 400 to produce the output SPL 200 for its own use. In still another alternative embodiment, the SMS 14 of the digital cinema system 10 of FIG. 1 can perform re-cueing process 400 of FIG. 5 in real-time, as it presents the show.

In an alternative embodiment according to the present principles, the re-cueing technique described above can heuristically generate cues appropriate for making a complete output SPL 200 from a sequence of the CPLs (e.g., input SPL 100, but without cues 111-114). This becomes possible because the intuitive location for the Start of Show cue 111 coincides with the beginning of the first CPL 101, the End of Show cue 114 lies at the end of the last CPL 106, and the Start of Feature cue 112 lies at the start of the only (or first) CPL having ContentKind="feature" (per the SMPTE CPL standard, op. cit.), or absent finding such metadata, the longest CPL. If the feature CPL 105 has markers, including at least one of "FFEC" (first frame of end credits) or "FFMC" (first frame of moving credits), as provided by a studio or other content provider, to identify events within a composition, then the Start of Credits cue 113 can lie coincident with either one of these markers, based on the exhibitor's preference. The result would yield an SPL substantially like the input SPL 100, which can then serve as the input to re-cueing process 400 for subsequent processing. In cases where suitable markers do not exist, or where zero or more than one CPL indicates that it is the feature content, this process preferably notifies exhibitor personnel to obtain a clarification.

The foregoing describes a technique for controlling one or more activities within a digital cinema presentation by adjusting the occurrence of cues that trigger such activities to achieve a more aesthetic showman-like presentation.

The invention claimed is:

1. A method comprising the steps of:
   (a) examining a playlist specifying a time sequence of events to occur during presentation of digital cinema content to identify at least one cue which triggers the occurrence of an activity;
   (b) automatically determining for the at least one identified cue, a prefire interval by which the cue should be advanced; and
   (c) advancing execution of the at least one to trigger the corresponding activity by the automatically determined pre-fire interval.

2. The method according to claim 1 wherein the step of (b) automatically determining the prefire interval further comprises the step of searching a database for a prefire value corresponding to the at one least identified cue.

3. The method according to claim 2 wherein the step (b) of automatically determining for the at least one identified cue, a prefire interval further comprises the step of assigning the cue a default value in the absence of finding a corresponding prefire value in the database.

4. The method according to claim 1 further comprising the step of checking whether the cue lies inside a composition play list (CPL), and if so then adjust the cue offset in the same CPL so the cue gets adjusted by the prefire amount to locate the cue closer to the start of the CPL.

5. The method according to claim 1 further comprising the steps of:
   (i) checking whether the cue lies inside a first composition play list (CPL), and if not;
   (ii) checking whether a second CPL exists prior to the first CPL ahead of which lies a cue of interest; but if not, then
   (iii) inserting a dummy CPL at a play list beginning.

6. The method of according to claim 1 wherein the steps of (a), (b) and (c) are performed in advance of presentation of digital cinema content to yield a pre-cued play list.

7. The method according to claim 1 wherein the steps of (a), (b), and (c) occur during execution during of the play list.

8. A digital cinema system comprising:
   a digital cinema projector;
   a screen automation system for controlling at least one activity within a theater
   a screen management system including a digital cinema server for controlling operation of the digital cinema projector in accordance with a play list containing at least one cue for triggering the screen automation system to control the at least one activity; and
   a theater management system for controlling the screen management;
   wherein at least one of the theater management system and the screen management system re-cueing the play list by automatically determining for at least one cue a prefire interval by which the cue should be advanced; and advancing execution of the at least one cue to trigger the corresponding activity by the automatically determined pre-fire interval.

9. A digital cinema system comprising:
   a digital cinema projector;
   a screen automation system for controlling at least one activity within a theater
   a screen management system including a digital cinema server for controlling operation of the digital cinema projector in accordance with a play list containing at least one cue for triggering the screen automation system to control the at least one activity; and
   wherein the screen management system re-cues the play list by automatically determining for at least one cue a prefire interval by which the cue should be advanced; and advancing execution of the at least one cue to trigger the corresponding activity by the automatically determined pre-fire interval.

10. A screen management system including a digital cinema server for controlling operation of a digital cinema projector in accordance with a play list containing at least one cue for triggering at least one activity; wherein the screen management system re-cues the play list by automatically determining for at least one cue a prefire interval by which the at least one cue should be advanced; and advancing execution of the at least one cue to trigger the corresponding activity by the automatically determined pre-fire interval.

* * * * *